United States Patent [19]
Ackermann

[11] 3,793,808
[45] Feb. 26, 1974

[54] PROCESS FOR THE PURIFICATION OF GASES

[75] Inventor: Paul Ackermann, Moers, Germany

[73] Assignee: Polycarbona Chemie GmbH, Hamburg, Germany

[22] Filed: Dec. 13, 1971

[21] Appl. No.: 207,443

[52] U.S. Cl. .................................................. 55/89
[51] Int. Cl. ............................................ B01d 47/06
[58] Field of Search ....... 55/84, 89, 90, 92, 87, 178, 55/230, 244

[56] References Cited
UNITED STATES PATENTS
3,613,333  10/1971  Gardenien ............................ 55/89
3,487,620  1/1970  Klein et al. ........................... 55/222

FOREIGN PATENTS OR APPLICATIONS
846,076  7/1970  Canada

Primary Examiner—Charles N. Hart
Attorney, Agent, or Firm—Thomas H. Whaley; Carl G. Ries

[57] ABSTRACT

A process for washing industrial waste gases which contain foam-forming substances comprises (1) atomizing an aqueous washing liquid with a centrifugal atomizer of Canadian Pat. No. 846,076 into 50–150μ diameter droplets for slowly descending in a tower containing the gas to be washed at a rate requiring greater than two seconds, (2) slowing the vertical descent of the gas relative to the liquid droplets for allowing the droplets to drop into a sump in the bottom of the tower, and (3) recirculating the aqueous washing liquid from the sump up to the atomizer in the top of the tower.

1 Claim, 6 Drawing Figures

PROCESS FOR THE PURIFICATION OF GASES

DESCRIPTION OF THE PRIOR ART

It is known to purify gases, particularly industrial waste or off gases, by washing them in trickle towers, stacked columns or plate-type columns, Feld washers, Schroeder washers, Theisen washers or the like. However, when the gas to be purified contains foam-forming substances which are absorbed by the wash water, it may happen that the formation of large or troublesome quantities of foam cannot be controlled even by adding an anti-foaming agent. Foaming is particularly severe when the gas bubbles are mixed throughout the wash liquid as is the case, for example, in wash towers which contain installations of widely varying kinds, for example, baffles, in stacked columns or in plate-like columns. Such troublesome foaming also occurs in what are known as "absorption machines," for example Feld type, Schroeder type, or Theisen type washers. The discharge of foam in absorption machines or this kind is generally suppressed by feeding fresh water to the uppermost step, that is to say to the last washing step, this being, for example, the case in Feld type washers. These methods are, however, costly since the wash liquid is too coarse, that is to say, the wash liquid is divided into droplets of an average size of about 2 mm., and a substantial amount of wash liquid has thus to be recirculated in each individual step and, in addition, a substantial number of washing steps are required if an adequate washing or scrubbing of the gas is to be ensured.

It is also known to wash or scrub gases by means of a finely atomized wash liquid wherein the gas is caused to flow in a countercurrent direction to the spray of washing liquid. This, however, causes a zone-wise accumulation of the drops whose velocity of fall is similar to the rate of flow of the gas, combined with uncontrollable escape of gas and blowing (Zerblasen) of the gas in all directions. The drop separator provided above the spraying zone would become flooded and, in addition, the liquid tending to foam would be ejected in the form of a foam through the chimney.

The aqueous washing liquid may be finely atomized by hydrodynamic or pneumatic atomizer nozzles or by atomizer disks, but when the washing liquid to be sprayed contains foam-forming substances, hydrodynamic atomizer nozzles are incapable of producing minute droplets of liquid, since the nozzles, which have the requisite small diameter become clogged too readily.

Moreover, pneumatic atomizer nozzles are also unsuitable for atomizing an aqueous washing liquid which contains foam-forming substances, since such pneumatic atomizer nozzles produce substantial quantities of foam when the driving air is blown therethrough.

The conventional atomizer disks draw in gas in a manner similar to turbines with the result that aqueous washing liquids containing foam-forming substances are foamed even more so.

SUMMARY OF THE INVENTION

This invention provides a method for the substantially foamless washing or scrubbing of gases which contain foam-forming substances. This method for washing gases with an aqueous washing liquid is carried out by recirculating the liquid to create the required surface area for a substantially total exchange of substances, that is, mass transfer of clean gas from the washing liquid, resulting in an increase in the amount of the constituents or foreign material in the liquid which is washed from the gas.

It has been found that gases, and particularly industrial waste gases, which contain foam-forming substances, may be purified with an aqueous washing liquid without the formation of foam when one step of the method comprises supplying the recirculated washing liquid to an atomizer disk of substantially the construction disclosed in Canadian Pat. No. 846,076 by Paul Ackermann and Gerhard Kloempken, particularly FIGS. 2–6 herein, by which the washing liquid with the gases therein is atomized into droplets of a diameter of essentially 10–200$\mu$, and preferably of a diameter of 50–150$\mu$, in an empty wash tower, so that the droplets thus formed are moved in concurrent flow with the downwardly flowing gas to be washed, the period of contact between the droplets of washing liquid and the gas exceeding 2 seconds, preferably exceeding 5 seconds, whereupon the bulk of the droplets are precipitated by gravity precipitation in a static body or surface of the liquid as the rate of flow of the gas is simultaneously reduced. The finer droplets retained in the gas are preferably precipitated by centrifugal precipitation by tall, vertical baffles whose lower edges dip into the sump or static body of liquid and the gas flows between vertical slots at the same rate or at a reduced rate into a voluminous annular space.

Where an elevated washing temperature is desirable, steam is preferably added to the gas before it contacts the droplets of washing liquid, the quantity of added steam being sufficient to ensure that the temperature rises by as much as from 2° to 20° C., preferably from 5° to 10° C., higher than the gas temperature prior to the addition of the steam.

Where an atomizer disk of the construction disclosed in the above identified patent and further in FIGS. 2–6 is used, the washing liquid is carried by a feed pipe in an axial direction to a driving shaft to which two disks, i.e., a cover plate and a base or bottom disk interconnected by webs are secured. The driving shaft centrifuges the washing liquid against the tube enclosing the shaft. As a result, the liquid flows concentrically on to the bottom disk of the atomizer to be uniformly dispersed and to be centrifuged outwardly through slots by the connecting webs serving as driving vanes at a peripheral speed substantially corresponding to the peripheral speed of the atomizer disk. The connecting webs act as baffles since their flat or planar boundary surfaces are positioned at the periphery of the disks at an angle of 20° or more to a radius of the disks. The inner and outer surfaces of the webs are tilted outwardly from top to bottom at an angle of up to 10° as seen at the left and right sides of FIG. 4. The horizontal clearance between any two webs is equal to or up to twice the radial length of the webs and does not decrease in the direction of the periphery, i.e., the opposite surfaces of adjacent webs are substantially parallel to each other. The vertical clearance or distance between the internal smooth base and the cover plate at the periphery is preferably twice the horizontal clearance between two adjacent webs.

The quantity of fresh water used is also a decisive factor in the economy of the method according to the invention. By virtue of the recirculation and fine dispersion of the washing liquid combined with the long period of contact between the droplets and the gas, the gas is adequately washed and the amount of washed-out substances in the washing liquid is increased to such an extent that only small amounts of fresh water are required and an economical recovery of the substances concentrated in the washing liquid for saving or discarding is possible.

The method according to the invention is particularly suitable for the waste gases evolved in the gas-catalytic oxidation of naphthalene, such gases being previously cooled to a temperature of between 40° to 70° C.

The results of the disclosed method have been that the gas is very well and extensively purified by the droplets of an already partially saturated washing liquid (i.e., the recirculated liquid) carried in concurrent flow after a contacting period as it falls through the air as short as approximately 2 seconds, and with no formation of foam occurring.

DESCRIPTION OF THE DRAWINGS

The drawings diagrammatically illustrate by way of example, not by way of limitation, two forms of mechanisms for carrying out the new disclosed method wherein like reference numbers have been employed to indicate similar parts in the several views in which.

DESCRIPTION OF THE PREFERRED EMBODIMENTS

The invention disclosed herein, the scope of which being defined in the appended claims is not limited in its application to the details of construction and arrangement of parts shown and described for carrying out the method, since the invention is capable of other embodiments for carrying out other methods and of being practiced or carried out in various other ways. Also it is to be understood that the phraseology or terminology employed herein is for the purpose of description and not of limitation.

Figure 1:
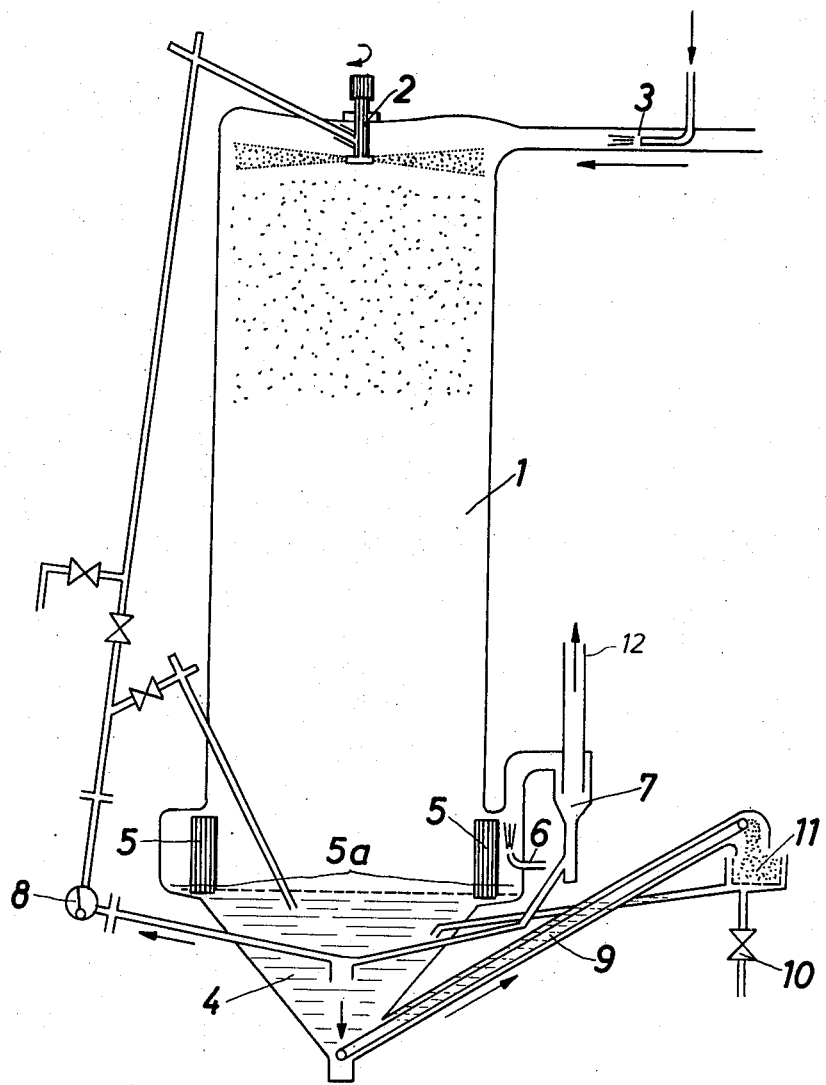
FIG. 1 is a schematic illustration of a mechanism for carrying out the method of the invention.

A washing tower 1, FIG. 1, for carrying out the new method of washing waste gases has a height which is determined by the desired size of the droplets and by the desired contact period, normally a height of about 10 metres. The bulk of the droplets formed by a disk or centrifugal atomizer 2 settle in the sump 4 of the wash tower 1. The droplets are too small and fall too slowly to entrain any gas into the sump and thus form a foam. The balance of the gas is precipitated by rotating vertical baffles 5 which dip into the sump 4 and, finally, by a centrifugal separator 7. Fresh water is sprayed by a nozzle 6 into the gas between the baffle plates 5 and the centrifugal separator 7. The solids spontaneously precipitated in the sump 4 are removed by a conveyor 9, 11. A pump 8 feeds the recirculated washing liquid to the disk atomizer 2. The addition of steam from steam nozzle 3 to the gas to be washed is desirable for limiting the cooling down of the droplets of washing liquid due to evaporation, for increasing the temperature in order to accelerate the washing process, and, particularly, for assisting the hydration of the phthalic anhydride present in gases evolved in a phthalic anhydride plant.

CENTRIFUGAL ATOMIZER

Two centrifugal atomizers for atomizing the waste gases that have made the above described method so successful with great and unobvious results are disclosed in Canadian Pat. No. 846,076, FIGS. 4, 4a, 4b, 6, and 6a, and reproduced here as FIGS. 2–6, respectively.

Figure 2:
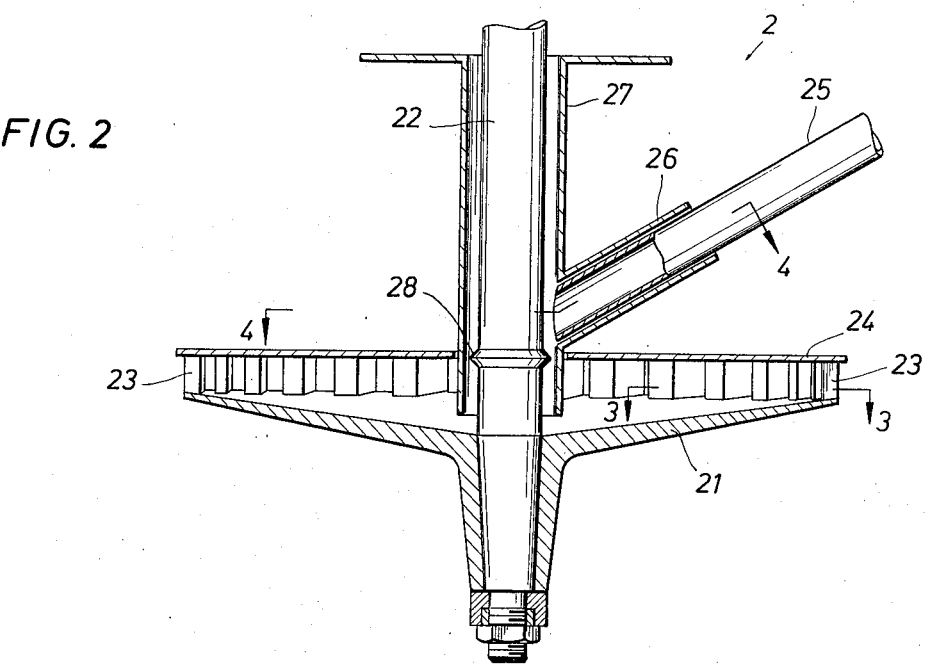
FIG. 2 is a schematic vertical section of one embodiment of a centrifugal atomizer for carrying out the new method.
Figure 3:
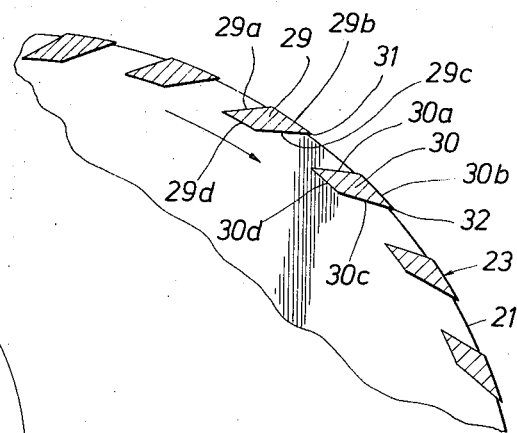
FIG. 3 is a section view taken at 3—3 on FIG. 2.
Figure 4:
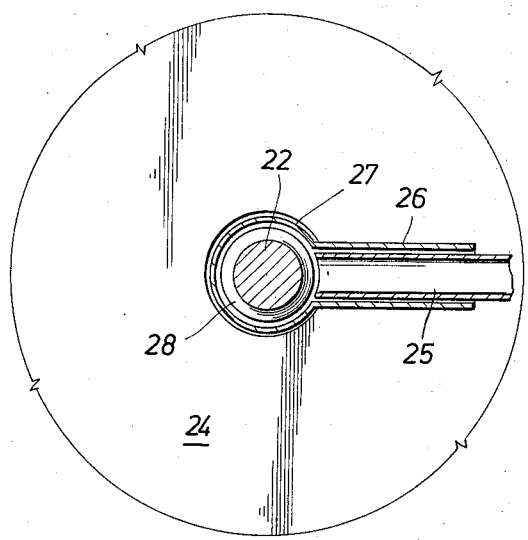
FIG. 4 is a sectional view taken at 4—4 on FIG. 2.
Figure 5:
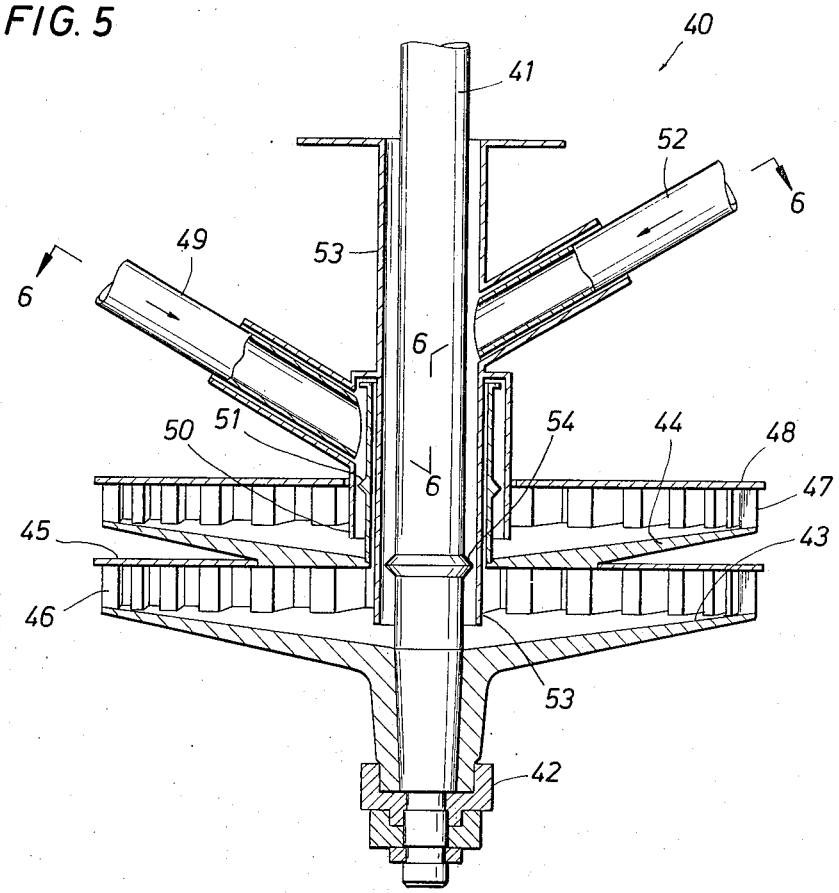
FIG. 5 is a schematic vertical section of a second embodiment of a centrifugal atomizer for carrying out the new method.
Figure 6:
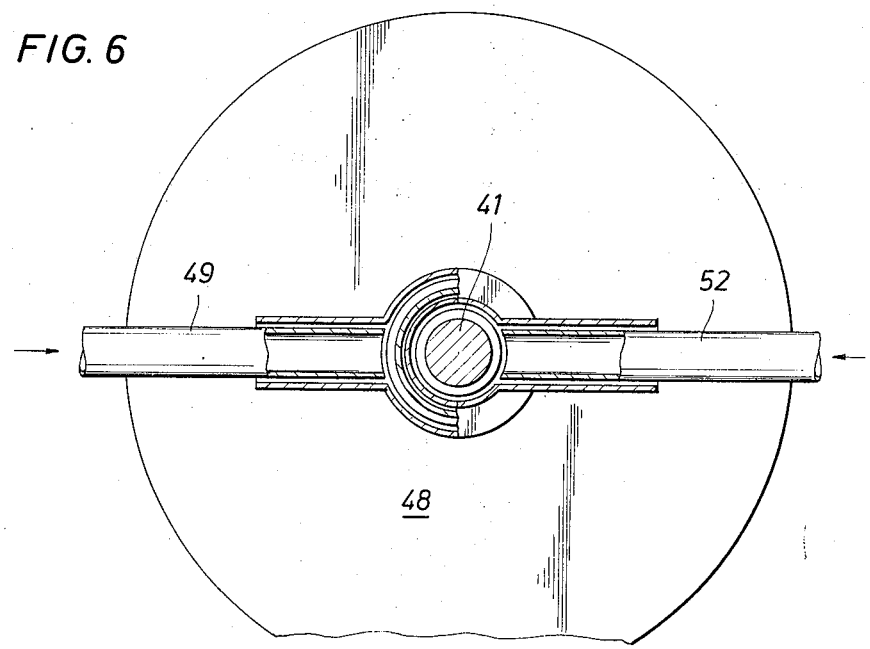
FIG. 6 is a sectional view taken at 6—6 on FIG. 5.

FIGS. 2–4 illustrate one embodiment of the centrifugal atomizer 20 utilizing one pair of co-axial disks, and FIGS. 5 and 6 illustrate a second embodiment 40 of the centrifugal atomizer utilizing two pairs of co-axial disks in tandem.

FIG. 2, a vertical sectional view of the centrifugal atomizer 20 comprises a lower disk 21 shaped like a shallow, hollow cone and screwed securely on to a shaft 22 driven from above (not shown). Lower disk 21 having a diameter of 350mm. (millimeters) slants upwardly from its center at an angle of approximately 10° above the horizon. Angled webs 23 on the upper surface of lower disk 21 and at the periphery thereof fixedly connect upper disk 24 to lower disk 21. With the upper disk having a diameter of 360 mm., webs 23 join the two disks 21 and 24.

Liquid feed pipe 25 fits loosely in pipe connection 26 on fixed central pipe 27 and at an angle of 45° thereto, which pipe 27 encloses drive shaft 22 and extends down through upper disk 24 to within 10 mm. of lower disk 21. A centrifugal or slinger ring 28 on main shaft 22 propels the liquid onto pipe connection 26 from which the liquid runs in a thin, evenly distributed layer down the internal wall surface of pipe connection 26 to drop on the upper surface of lower disk 21 from which the liquid is propelled centrifugally in minute droplets into the gas in the top of the tank.

Lower disk 21, FIG. 3 with angled webs 23 thereon slings the wash liquid off in small droplets at 2,900 revolutions per minute, for example. Considering two typical webs 29 and 30, as seen in the FIG. 3, the opposite sides 29c, 30a of adjacent webs 29, 30 are substantially parallel to each other, the outer ends 29b, 30b are arcs of a circle that is concentric to the circle that the arcuate sides 29d and 30d are arcs of, and the leading edge 31 must be at the intersection of outer end face 29b and forward side 29c, as well as the leading edge 32 must be at the intersection of outer end face 30b and forward side 30c. Likewise, the distance between any two webs is in the range between the length of the web and twice the length of the web. The height of a twice is in the range between the distance between two adjacent webs and twice the distance between two webs.

The speed at which the film of liquid moves on the front faces of the webs, and thus the size of the drops are determined by the adjusted angle of the webs, which angle between the tangent to the peripheral edge of the lower disk 21 at the web leading edge 31 or 32 and the web front face is equal to an obtuse angle that is preferably between 121° and 170°, and by the physical properties of the liquid and the quantity of liquid put through. In this sense, the vertical distance between the disks or height of the webs may be varied between 8 mm and 30 mm., the adjusted distance increasing with increasing viscosity or increasing quantities of liquid passed through. The leading acute-angled edge formed at the outside of the web causes a vigorous and sharp turbulent detachment of the film of liquid, which is thus broken and divided sharply and uniformly into fine drops of substantially uniform size.

The second embodiment, FIGS. 5 and 6, of a centrifugal atomizer 40 comprises two pairs of disks fixed together, FIG. 5 being a vertical sectional view and FIG. 6 being a sectional view at 6—6 on FIG. 5.

A shaft 41 which is driven from above has a screw fastening attaching means 42 on the bottom for securing the first and lower shallow conical shaped disk 43 thereto. A second or upper shallow conical shaped disk 44 has a lower flat disk 45 integral thereto at the bottom surface of the upper disk 44. Lower webs 46, similar to webs 23 of the other embodiment of FIG. 3, fixedly secure the upwardly sloping periphery of lower disk 43 to the periphery of horizontal flat disk 45, FIG. 5. Likewise, upper webs 47 are secured between the periphery of the upper surface of upper disk 44 and the periphery of the lower surface of an upper horizontal flat disk 48. All disks other than the lower disk 43 are stacked on the lower disk and supported therefrom and circumscribe the shaft 41. A liquid feed inlet pipe 49, similar to 25 of FIG. 2, supplies liquid to the upper conical disk 44 via fixed central pipe 50 having a slinger ring 51. Upper liquid feed inlet pipe 52, similar to 25 of FIG. 2, supplies liquid to the lower conical disk 43 via fixed central pipe 53 internally of pipe 50 having a slinger ring 54 similar to 27 and 28, respectively, of FIG. 2. Both fixed central pipes 50 and 53 are closed at the tops thereof around the shaft 41.

FIG. 6, a sectional view at 6—6 on FIG. 5, illustrates the two liquid feed inlet pipes 49 and 52.

While the centrifugal atomizer 40 of FIG. 5 operates similarly to centrifugal atomizer 20 of FIG. 2, the former atomizer is designed to atomize a greater quantity of liquid comparative to the latter atomizer.

As for further description, while one construction of the two-disk distributor or atomizer 40 is illustrated in vertical section in FIG. 5, a section on the line 6—6, FIG. 6 shows the feed inlet pipes and drive shaft. The two main disks 43 and 44 are mounted at superimposed positions on a shaft 41 which is driven at the top, the lower disk 43 being driven by the shaft and transmitting the driving impulse to the upper disk 44. Each of the two disks has its own equipment for the feeding and all-round distribution of the liquid. The construction and operation of this equipment are substantially as hereinafter described with reference to FIGS. 2, 3, and 4. The upper disk is different, inasmuch as the liquid, instead of being introduced in the direction of the driving shaft, is introduced axially in the direction of a rotating central pipe which is secured in position on the base of the disk. Over-straining of the shaft bearings is avoided by the small film of liquid which is applied uniformly to the disk or disks. Non-uniform quantities of liquid are then prevented from drifting away in various directions, and are thus prevented from applying a constant and unilateral pressure on the shaft, and from producing an unbalanced force on the distributor body.

In accordance with one particular feature of the invention, the liquid is allowed to flow radially against the driving shaft instead of tangentially into the stationary central pipe by which the shaft is enclosed. Thus the central pipe passes through an opening provided in the cover plate, to a position about 5–20 mm. above the lower disk. The feed inlet connection or pipe is inclined at an angle of about 30° to 80° to the horizon, and the liquid is centrifuged by the shaft uniformly around and against the inside of the central pipe. Residual creeping liquid or falling drops are centrifuged by the centrifugal or slinger ring, which may alternatively be provided as a spiral member, disposed at a slightly lower level, against the central pipe. At the lower end of the central pipe, which lower end is provided with a cutting edge, the liquid forms a substantially uniform cylinder which flows on to the disk without perceptible flutter. An additional reason for the suppression of such fluttering is that, in contrast to the known disks, this disk has no sucking action, so that no gas is drawn from the feed connection through the jacket of liquid. With the quantities conventionally charged, a tangential introduction of the liquid into the central pipe fails to produce an all-round distribution, and a spiral swelling of liquid flows downwardly contacting the disk on one side with resultant unilateral loads applied to the disk with the result that the material and the pressure apply unilateral loads to the disk, the shaft, and the bearings.

The pipe for feeding the liquid is introduced loosely into the feed inlet pipe connection from the outside. Thermal stresses are thereby avoided, and the pipe may be removed for cleaning at any time without having to be cooled. In this method of all-round distribution no other means of introduction, such as numerous tubes or distributor rings which may often become clogged on one side, are required.

The method according to the invention is illustrated in the following examples.

EXAMPLE I

Saturated steam of a temperature slightly exceeding 100° C. was injected at a rate of 700 kg/hr. into a waste gas from a process of catalytic air-oxidation of naphthalene to phthalic anhydride, the waste gas issuing from the phthalic anhydride separators at a temperature of about 55° C. and a rate of 44,000 normal cubic metres per hour. Washing liquid enriched with about 220 grams of maleic acid per litre was sprayed at a rate of about 900 litres per hour by the disk atomizer 2 into the downwardly flowing gas which was admitted at the head of a wash tower 1, the height of which was about 11 metres and the diameter of which was 4 metres. The peripheral speed of the 35 cm. diameter atomizer disk was variable between 30 and 120 metres per second and adjustable to 60 metres per second. The diameter of the curtain of spray thus corresponded substantially to the diameter of the wash tower. A small percentage of the sprayed liquid in the form of the largest drops having diameters of from 0.3 mm to 0.5 mm. impinged upon the inside wall of the tower to form thereon a film of liquid whereby the wall and the baffles 5 were continuously being washed.

The washed gas flowed through the rings of baffles 5 into an annular space 5a where after being simultaneously sprayed with water, preferably fresh water, from a nozzle 6, the centrifugal separator 7 exhausted the gas out the chimney 12.

The volume of spray water used was determined by the desired degree of enrichment in maleic acid in dependence upon the content of maleic anhydride vapor present in the gas before the washing operation. Almost all of the spray water, of which only a little had evaporated, collected in the bottom of the cyclone or centrifugal separator 7, and was then introduced into the sump 4, preferably directly into the suction vessel or in line with the circulation pump 8, at a rate of about 120 litres per hour. About 140 litres of washing solution containing about 275 grams of maleic acid per litre were piped from the respective cycle at the valve 10 or from a conduit provided on the pressure side downstream of the pump 8 for further processing (e.g., utilization or combustion).

The sludge collecting in the sump 4 at the bottom of the tower 1, which sludge consisted predominantly of naphthoquinone and condensation products thereof, was discharged continuously or intermittently from the lowermost point by a sieve-type bucket conveyor 9. The sludge drained off on to the screen or sieve 11 may then be fed to a phthalic anhydride refining plant.

The steam injected through nozzle 3 into the gas to be washed caused the temperature of the gas to rise by about 2° C. Before the steam had been added, the gas contained about 22 grams of water vapor per cubic metre. If no steam had been added, the gas having a sensible heat of 0.31 kilocalories per normal cubic metre and ° C. would cool down by 22° C. and cause an evaporation of 12 grams of water per normal cubic metre from the wash solution in the wash tower in which a total exchange or transfer of heat and material occurs. The washing temperature of the gas and of the liquid would thus remain static at 33° C.

However, as a result of a selected addition of 16 grams of steam per normal cubic metre, only 10 grams of water evaporate in the wash tower and the gas was cooled down only from 57°to 39° C. The static washing temperature in the tower was thus 39° C., at which temperature the water vapor content in the gas adjusted itself to 48 grams per normal cubic metre.

The increased washing temperature improved the washing efficiency, this being due to the increased rate of dissolution and also to the accelerated hydration of the anhydrides, particularly phthalic anhydride. Moreover, it was possible to maintain more substances in solution before precipitation or separation upon saturation had occurred.

For temperatures above 40° C., a heating of the aqueous washing liquid ceased to be economically feasible, either indirectly or by injecting steam at any position in the washing system, since the steam requirements rose in proportion to the rising saturation pressure level of the water vapor. Thus, 83 grams of steam per normal cubic metre of gas was required to be additionally introduced or that much water would have had to be evaporated from the liquid by extraneous energy in order to maintain a washing temperature of 55° C.; in this particular Example that would amount to 3.65 tons of steam per hour.

The gas, before and after washing, contained on the average the following substances:

| | Maleic anhydride | Phthalic anhydride | Naphtho-quinone | $SO_2$ | $SO_3$ |
|---|---|---|---|---|---|
| Before the washing process (mg/Nm³) | 750 | 120 | 90 | 15 | 50 |
| After the washing process (mg/Nm³) | 30 | 21 | 14 | 0.3 | 55 |
| Washing efficiency (%) | 96 | 82.5 | 84.4 | 98 | (−10) |

The washing efficiencies obtained when fresh water was used in the washing tower according to the invention instead of an aqueous liquid enriched with dissolved substances (that is, the recirculated liquid) are given below:

99.5 percent in the case of maleic anhydride,
86 percent in the case of phthalic anhydride, and
88 percent in the case of naphthoquinone.

Thus the washing efficiency of the aqueous washing liquid was only slightly lower than that of fresh water.

When the washing was carried out by recirculation, there was a discharge at the valve 10 of a solution at a rate of about 140 litres per hour containing on an average the constituents shown in the following table:

| | Kg/h | % by weight |
|---|---|---|
| Maleic acid | 37.8 | 24.4 |
| Phthalic acid | 4.9 | 3.0 |
| Naphthoquinone | 0.6 | 0.4 |
| $H_2SO_4$ | 0.3 | 0.2 |
| Water | 110 | 72.0 |

A portion of the dissolved sulfuric acid reacted with naphthoquinone and was thus reduced to sulfur dioxide which was carried away by the waste gas.

In addition, naphthoquinone or condensation products thereof in the form of solids were present in the washing liquid. The bulk of the solids, depositing on the bottom of the tower at a rate of 2.7 kilograms per hour, were withdrawn in the form of a wet sludge by a conveyor 9. About 40 percent of the dry mass in the form of 1,4 - naphthoquinone was recovered therefrom.

EXAMPLE II

Steam was injected into the waste gas obtained in the production of phthalic anhydride referred to in Example I, at a rate of 450 kg. per hour. An aqueous liquid obtained as a cleaning liquid was used in a refining plant for the production of maleic anhydride by a gas phase catalytic oxidation of benzene. It was introduced directly into the sump of the wash tower at a rate of 250 litres per hour. The liquid, which was maintained at a temperature of 80° C. or at a higher temperature, contained 4.2 percent by weight of fumaric acid, 1.6 percent by weight of maleic acid and 5.2 percent by weight of an acidic substance which had properties similar to humic acid and which was readily soluble in water. This acidic substance is hereinafter referred to as "acid tar." This acid tar caused a particularly persistent foaming and only when used in the method according to the invention did it not cause trouble when it formed a constituent of the washing liquid.

A washing solution was sprayed into the wash tower by a distributor or atomizer 2 at a rate of 1,100 litres per hour. The temperature in the washing tower adjusted itself to 36° C. The sediments which were continuously forming in the sump of the tower were continuously being removed therefrom by the conveyor. The dry mass of sediments formed at a rate of about 14 kg. per hour and contained about 60 percent by weight of fumaric acid, 15 percent by weight of naphthoquinone and 20 percent by weight of condensation products of naphthoquinone as well as small amounts of phthalic acid and maleic acid.

Water at a rate of about 80 litres per hour was sprayed into the waste gas at a position upstream of the waste gas cyclone or centrifugal separator 7. The efficiency of the washing of the gaseous phthalic anhydride in the stationary (equilibrium) states was similar to that obtained in Example I, the following amounts being washed out:

94.5 percent of the maleic anhydride, 78 percent of the phthalic anhydride, and
88 percent of the naphthoquinone.

Washing solution was continuously withdrawn at the valve 10 at a rate of 160 litres per hour, the solution containing the following quantities in the dissolved states at 38° C.:

| | kg/hr. |
|---|---|
| Fumaric acid | 2.3 |
| Maleic acid | 40.8 |
| Phthalic acid | 3.9 |
| Naphthoquinone | 0.7 |
| $H_2SO_4$ | 0.3 |
| Acid Tar | 13.7 |
| Water | about 110 |

The wet residue collected on the screen or sieve contained the following amounts of solids:

| | kg/hr. |
|---|---|
| Fumaric acid | 9 |
| Maleic acid | 1 |
| Phthalic Acid | 1 |
| Naphthoquinone | 1.3 |
| Condensation products | 1.4 |
| Acid Tar | 0.7 |

I claim:

1. A method for washing a gas containing a foam-forming substance comprising the steps of, a. atomizing a major portion of an aqueous washing liquid in an atomizer into 10–200$\mu$ diameter droplets for slowly descending in a tower containing the gas to be washed at a rate requiring not less than two seconds, b. adding an amount of steam to the gas to be purified for maintaining the dew point 5° to 10° C. higher than the dew point of the gas without steam, c. slowing the vertical descent of the gas relative to the wash liquid droplets for allowing a greater proportion of the droplets to drop into a sump in the bottom of the tower, and d. recirculating the aqueous washing liquid from the sump up to the atomizer in the top of the tower.

* * * * *

UNITED STATES PATENT OFFICE
CERTIFICATE OF CORRECTION

Patent No. 3,793,808         Dated February 26, 1974

Inventor(s) Paul Ackermann

It is certified that error appears in the above-identified patent and that said Letters Patent are hereby corrected as shown below:

Column 4, line 54, "twice" should be --web--.

Column 7, lines 58-64, in the table in these lines, the vertical column "15 - 0.3 - 98", inadvertently positioned between the third and fourth columns, should be moved back over to appear under its proper heading "$SO_3$", as column five.

Signed and sealed this 5th day of November 1974.

(SEAL)
Attest:

McCOY M. GIBSON JR.          C. MARSHALL DANN
Attesting Officer            Commissioner of Patents